Figure 1:
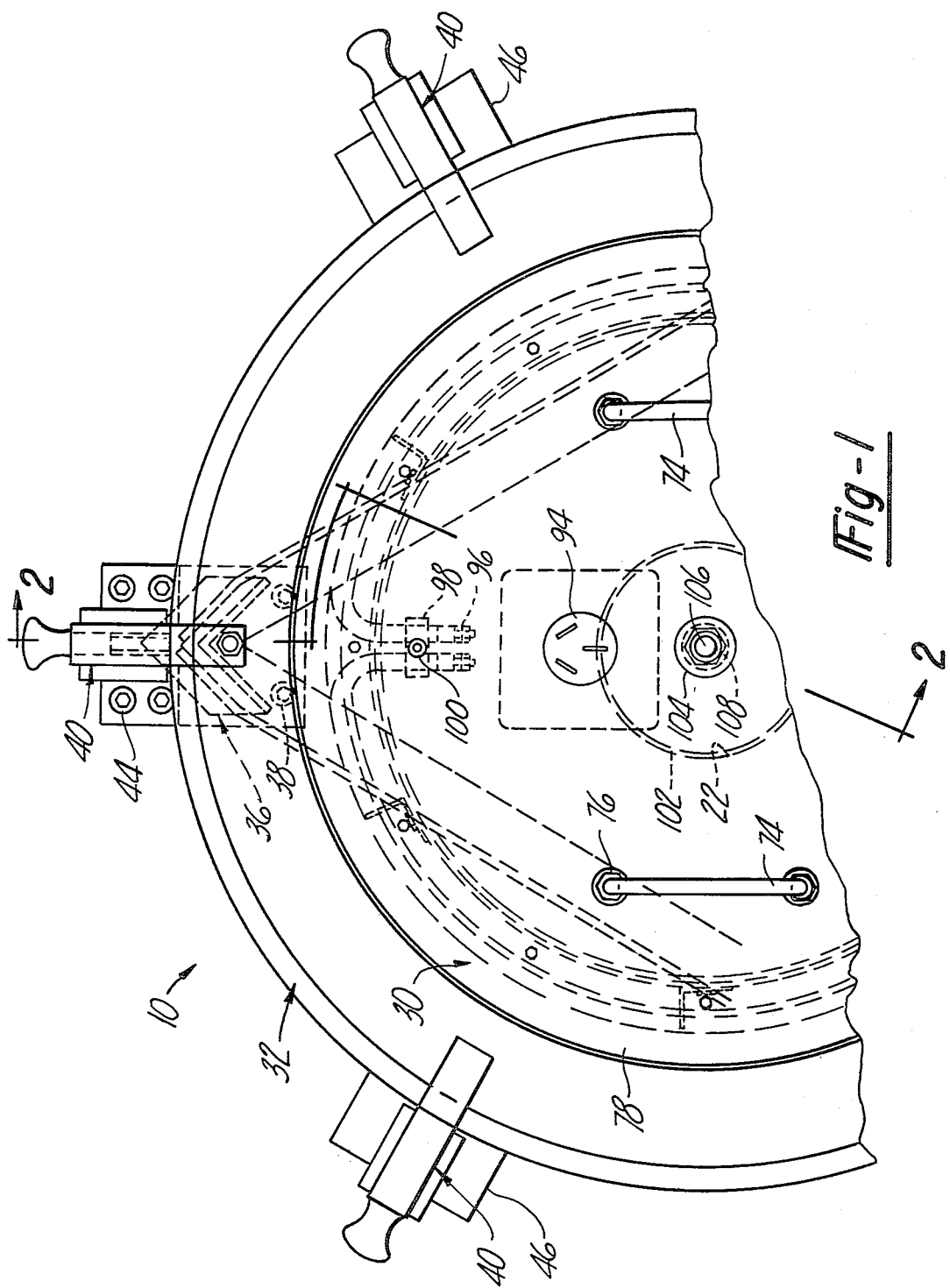

United States Patent [19]

Pringle

[11] 4,229,245
[45] Oct. 21, 1980

[54] BONDING FIXTURE

[75] Inventor: William L. Pringle, Grosse Pointe Shores, Mich.

[73] Assignee: Leonard Friedman, Beverly Hills, Calif.

[21] Appl. No.: 959,575

[22] Filed: Nov. 13, 1978

[51] Int. Cl.² .............................................. B29H 17/36
[52] U.S. Cl. ..................................... 156/382; 156/112; 156/394; 156/404; 156/499; 425/35
[58] Field of Search ............... 156/95, 112, 113, 96, 156/404, 394, 499, 381, 382; 425/17, 22, 25, 28 R, 32, 34 R, 35, 41, 44, 47

[56] References Cited

U.S. PATENT DOCUMENTS

| | | | |
|---|---|---|---|
| 1,779,396 | 10/1930 | Keller | 425/35 |
| 1,781,658 | 11/1930 | Keller | 425/35 |
| 3,963,417 | 6/1976 | Placek | 156/95 |
| 3,969,179 | 7/1976 | Foegelle | 425/44 |
| 3,986,802 | 10/1976 | Isom | 425/35 |
| 4,111,732 | 9/1978 | MacMillan | 156/96 |
| 4,115,171 | 9/1978 | Dundon | 156/96 |

*Primary Examiner*—John E. Kittle
*Attorney, Agent, or Firm*—Barnes, Kisselle, Raisch & Choate

[57] ABSTRACT

A fixture for bonding an elastomeric solid tire to a rim of a wheel. The fixture has mating first and second die portions defining an annular cavity constructed and arranged to receive the wheel and the tire with a bonding agent therebetween to be cured. The cavity and the tire define a circumferentially continuous passage into which a fluid is admitted under pressure to urge the tire radially inward into firm engagement with the rim of the wheel and heating elements are disposed radially inward of and adjacent the rim to raise the rim to an elevated temperature to cure the bonding agent and thereby firmly adhere the tire to the wheel.

11 Claims, 2 Drawing Figures

BONDING FIXTURE

This invention relates to bonding fixtures and more particularly to a fixture for curing a bonding agent to adhere a solid elastomeric tire to the rim of a wheel.

An elastomeric tire may be permanently adhered or vulcanized to a metal rim of a wheel by interposing a vulcanizing cement or adhesive between the rim and the tire and curing the adhesive by heating it to an elevated temperature for a period of time while maintaining the tire and the rim in firm engagement with each other. In order to carry out such bonding at a commercially practical rate it is desirable to have an appropriate bonding fixture for both heating the vulcanizing agent to a curing temperature and maintaining the elastomeric tire and rim of the wheel in intimate contact during curing of the vulcanizing agent.

Objects, features and advantages of this invention are to provide a fixture for bonding an elastomeric tire to a rim of a wheel which uniformly applies heat to the vulcanizing agent, minimizes heating of the elastomeric tire, decreases the energy required to maintain the vulcanizing agent at a curing temperature, uniformly urges the elastomeric tire into engagement with the rim of the wheel, permits the amount of force urging the tire into engagement with the wheel to be readily varied and easily controlled, results in improved bonding or adherence of the tire to the rim, and which is of simplified design, economical construction and assembly, and substantially maintenance free.

Figure 2:
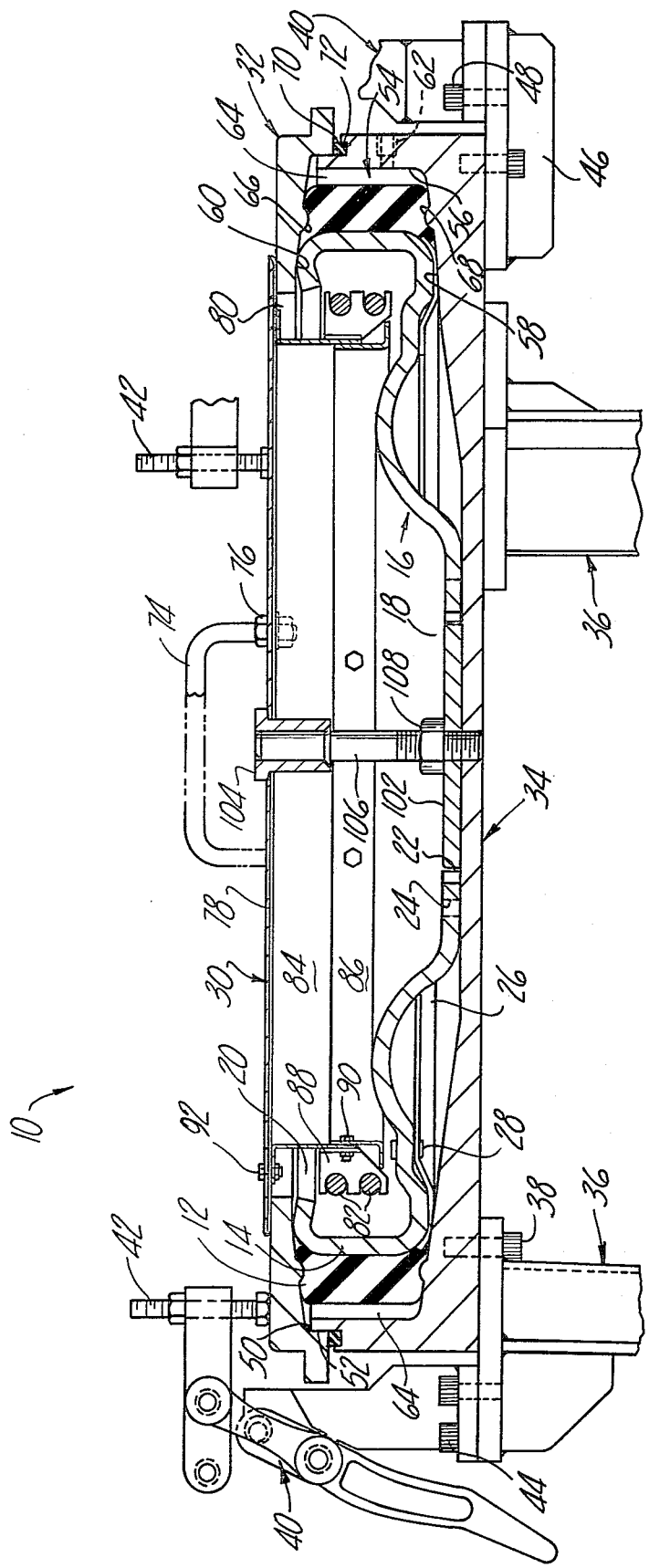

These and other objects, features and advantages of this invention will be apparent from the following detailed description, appended claims, and accompanying drawings in which:

FIG. 1 is a fragmentary plan view of a bonding fixture embodying the present invention; and FIG. 2 is a sectional view with portions broken away taken generally on line 2—2 of FIG. 1.

Referring in more detail to the drawings, FIGS. 1 and 2 illustrate a fixture 10 embodying this invention for bonding a solid ring or tire 12 of an elastomeric material to a rim 14 of a metallic wheel 16 with an integral disc 18. As shown in FIG. 2, rim 14 has a return bend lip 20, disc 18 has a central aperture 22 and mounting holes 24, and a wear ring or sheath 26 of sheet metal is secured to disc 18 by a plurality of rivets 28.

As shown in FIG. 2, fixture 10 has a heater assembly 30, an upper die portion or ring 32, and a lower die portion or body 34 between which tire 12 and wheel 16 are received. Fixture 10 is supported by three legs 36 secured to body 34 by cap screws 38. Ring 32 and body 34 are releasably secured together by six circumferentially spaced toggle clamps 40 with hexbolts and jamnuts providing adjustable hold-down studs 42. Three of the clamps 40 are mounted on the upper end of leg assemblies 36 by cap screws 44 and the other three clamps are mounted on body 34 by brackets 46 and cap screws 48. Ring 32 is positioned generally concentrically on body 34 by a cylindrical wall portion 50 which telescopes over a shoulder 52 of the body. Tire 12 and wheel 16 are received in a cavity 54 of fixture 10 defined in part by cylindrical end wall 56 of body 34 and axially spaced apart and inclined side walls 58 and 60 of body 34 and ring 32.

In accordance with one feature of this invention tire 12 is urged with a uniform force throughout its circumference into intimate engagement with rim 14 by a fluid such as air admitted through port 62 into a circumferentially continuous passage 64 defined by the cooperation of cavity 54 with tire 12. To prevent fluid from escaping from passage 64, seals are provided between tire 12 and cavity 54 by circumferentially continuous ribs 66 and 68 on the inclined walls of ring 32 and body 34 which ribs bear on and project into the side faces of the tire. Fluid under pressure is also prevented from escaping between ring 32 and body 34 by a circumferentially continuous elastomeric seal 70 received in a groove 72 in the body and bearing on the ring.

Heater assembly 30 is removably mounted on fixture 10 and has a pair of lift handles 74 secured by nuts 76 to a cover and carrier plate 78 which overlies and encloses an opening 80 in ring 32. In accordance with another feature of this invention, heater assembly 30 has circular electric heater elements 82 positioned radially and axially within, adjacent to and generally concentric with rim 14 of the wheel to uniformly heat to a curing temperature a bonding adhesive interposed between the rim and tire 12. To minimize heat losses and unnecessary heating of the tire 12, heater elements 82 are enclosed by cover 78 in a dead air space and provide localized heating of rim 14. Heater elements 82 are shielded to decrease heat loss by a pair of overlapping stainless steel rings 84 and 86, and are carried by six circumferentially spaced retainer brackets 88 secured to the rings by bolts and nuts 90. Ring 84 is secured to cover 78 by bolts and nuts 92.

An electric current is supplied to heater elements 82 through an electric receptical 94 mounted on cover 78 and connected by wires (not shown) to terminals 96 which are positioned on the cover by ceramic spacer blocks 98 and a cap screw 100. Wheel 16 is located generally concentrically in cavity 54 of the fixture by a disc 102 providing a pilot hub, and heater assembly 30 is located generally concentrically with both cavity 54 and wheel 16 by a bushing 104 secured to cover 78 and slidably received over the reduced shank of a locator pin 106. The lower end of pin 106 extends through locator disc 102, is threaded into body 34, and is locked by a jamnut 108 to prevent the pin from rotating and to secure disc 102 to the body.

In bonding the tire 12 to the wheel 16 a coating of a vulcanizing agent or adhesive is applied either to the inner periphery of the tire 12 or the outer periphery of the rim 14 or both and then the tire is positioned over the rim. The wheel with the tire received thereon is positioned in lower die body 34 of fixture 10 with central aperture 22 received over locator disc 102, upper die ring 32 is positioned over the shoulder 52 of the lower die body, and the die portions are secured together by closing toggle clamps 40. Thereafter, heater assembly 30 is positioned generally concentrically within wheel 16 with locator pin 106 received in bushing 104 and cover 78 bearing on upper die ring 32 as shown in FIG. 2, and a fluid such as air is admitted through port 62 into passage 64 to urge the tire into intimate engagement with the rim.

An electric current is supplied to heater elements 82 through receptical 94 and the heat produced by elements 82 is at least partially transferred to the rim 14 of the wheel by radiation and convection to raise to a curing temperature the vulcanizing agent or adhesive interposed between the rim and the tire. Heater elements 82 are controlled by an appropriate thermocouple preferably contacting the rim of the wheel and a temperature responsive control (not shown) to maintain the curing temperature substantially constant for the period of time required to cure the vulcanizing agent or adhesive. After curing of the vulcanizing agent, heater elements 82 are turned off, the pressure in passage 64 is relieved, heater assembly 30 is removed, toggle clamps 40 are released and the wheel 16 with the tire 12 bonded thereto is removed from the fixture.

Fixture 10 has been satisfactorily used to bond an elastomeric solid tire 12 of SBR rubber with an outside diameter of about 24 inches to a rim 14 with an outside diameter of about 22 inches of a wheel 16 of cast aluminum with a vulcanizing cement or agent commercially available as adhesive number OSN2-310 from Unibond, Inc., 5001 Bellevue, Detroit, Mich. 48211. Other suitable vulcanizing cements for various applications are commercially available from Dayton Coatings and Chemical Division of Whittaker Corporation, 10 South Electric St., West Alexandria, Ohio 45381. This vulcanizing agent is sprayed on the rim of the wheel and permitted to air dry at room temperature for about 30 minutes. Thereafter, rubber tire 12 is positioned on the rim 14 of the wheel and the wheel and entire assembly are placed in fixture 10. Rubber tire 12 is urged into intimate engagement with the outer periphery of rim 14 by admitting air into passage 64 in the fixture at a pressure in the range of 100 to 120 PSIG. Heater elements 82 are each of 2400 watts and heat the vulcanizing agent to a temperature in the range of about 300° to 320° F. for about 10 minutes to cure the vulcanizing agent and thereby adhere and bond the rubber tire to the rim of wheel 16. Normally, it takes about 15 to 20 minutes for the heater elements to raise the temperature of the vulcanizing agent from room temperature to the curing temperature and hence a total cycle time for heating and curing the vulcanizing agent is about 25 to 30 minutes per wheel.

From the foregoing description it will be apparent that bonding fixtures embodying this invention are of comparatively simple design, economical manufacture and assembly, require little if any maintenance in service, and may be readily and easily utilized to bond an elastomeric tire to a rim of a wheel. Intimate contact of the elastomeric tire and the rim during curing of the adhesive is assured by the pressurized fluid and die cavity arrangement which uniformly urges the rubber tire radially inward into engagement with the rim, permits the force urging the tire into engagement with the rim to be readily varied over a wide range, and provides a seal between the tire and the cavity which does not require any maintenance, repair or replacement and has a long in service life. Heater assembly 30 heats the vulcanizing agent uniformly, circumferentially and axially while minimizing heating of the elastomeric tire which is believed to produce a superior vulcanizing or bonding of the tire to the rim of the wheel and to minimize the amount of energy which must be expended to bond the tire to the wheel.

I claim:

1. A fixture for bonding an elastomeric ring to a generally circular and rigid rim of a wheel comprising, first and second die portions relatively movable to open and closed positions and constructed and arranged to define when closed a cavity receiving therein a wheel rim and an elastomeric ring to be bonded to the rim, said first die portion having a first wall encircling and spaced outwardly of the elastomeric ring and a second wall extending generally radially inward thereof to underlie at least a portion of the elastomeric ring, said second die portion having a third wall extending generally radially inward of said first wall to overlie at least a portion of the elastomeric ring and having a central opening therethrough, said die portions being constructed and arranged to define in cooperation with the elastomeric ring a passage encircling and opening onto the generally radially outer surface of such elastomeric ring such that when the die portions are closed and a fluid is admitted under pressure into said passage the elastomeric ring is urged generally radially inward into firm engagement with the rim, and heater means having a cover constructed and arranged to overlie said central opening through said third wall and at least one heater element disposed generally radially inward of such rim and constructed and arranged to heat the rim to an elevated temperature to cure a bonding agent interposed between the elastomeric ring and the rim such that the elastomeric ring is adhered to the rim of the wheel.

2. The fixture of claim 1 wherein said heater means extends generally circumferentially around and adjacent to the inner periphery of the rim of the wheel and is constructed and arranged so as to provide substantially uniform heating of the rim throughout the inner periphery thereof.

3. The fixture of claim 2 wherein said heater means comprises at least one electric heater element constructed and arranged in a generally circular configuration generally concentric with and radially inward of the rim such that the rim is heated by radiation and convection of heat from the electric heater element.

4. The fixture of claim 1 which also comprises first and second seal means each carried by one of said die portions and each constructed and arranged to prevent a fluid under pressure within said cavity from escaping therefrom between the elastomeric ring and its associated die portion when said die portions are closed.

5. The fixture of claim 4 wherein at least one of said first and second seals means comprises a circumferentially continuous rib carried by one of said die portions and bearing on a side face of the elastomeric ring when said die portions are closed.

6. The fixture of claim 1 which also comprises a first seal means interposed between said die portions and constructed and arranged to prevent fluid under pressure within said passage from excaping therefrom between said die portions when they are closed.

7. The fixture of claim 6 which also comprises second and third seal means each carried by one of said die portions and each constructed and arranged to prevent a fluid under pressure within said cavity from escaping therefrom between the elastomeric ring and its associated die portion when said die portions are closed.

8. The fixture of claim 7 wherein at least one of said second and third seal means comprises a circumferentially continuous rib carried by one of said die portions and bearing on a side face of the elastomeric ring when said die portions are closed.

9. A fixture for bonding an elastomeric ring to a generally circular and rigid rim of a wheel comprising, first and second die portions relatively movable to open and closed positions and constructed and arranged to define when closed a cavity receiving therein a wheel rim and an elastomeric ring to be bonded to the rim, said die portions being constructed and arranged to define in cooperation with the elastomeric ring a passage encircling and opening onto the generally radially outer surface of the elastomeric ring such that when the die portions are closed and a fluid is admitted under pressure into said passage the elastomeric ring is urged generally radially inward into firm engagement with the rim, said first die portion having a generally cylingrical first wall and a second wall inclined thereto and extending generally radially inward thereof, said second die portion having a ring with a central opening therethrough and a third wall defining a portion of said cavity, said third wall being inclined to said first wall and extending generally radially inward thereof, and heater means disposed generally radially inward of such rim and constructed and arranged to heat the rim to an elevated temperature to cure a bonding agent interposed between the elastomeric ring and the rim such that the elastomeric ring is adhered to the rim of the wheel, said heater means having a cover constructed and arranged to overlie said central opening through said ring and at least one heater element carried by said cover and constructed and arranged to be disposed inward of the rim of the wheel when said cover is received over said opening of said ring.

10. The fixture of claim 9 wherein said die portions are constructed and arranged to cooperate with said cover such that when said cover is received over said opening of said ring said heater element is enclosed in a dead air space.

11. The fixture of claim 10 wherein said heater element comprises a generally circular electric heater element carried by said cover plate such that said heater element is disposed adjacent, generally axially within and radially inboard of the rim of the wheel when said cover is received over said opening of said ring.

* * * * *